(12) United States Patent
Siegfriedsen

(10) Patent No.: US 10,745,087 B2
(45) Date of Patent: Aug. 18, 2020

(54) MOORING BUOY FOR A FLOATING WIND TURBINE

(71) Applicant: Aerodyn Consulting Singapore PTE LTD, Singapore (SG)

(72) Inventor: Sonke Siegfriedsen, Rendsburg (DE)

(73) Assignee: Aerodyn Consulting Singapore PTE LTD, Singapore (SG)

( * ) Notice: Subject to any disclaimer, the term of this patent is extended or adjusted under 35 U.S.C. 154(b) by 0 days.

(21) Appl. No.: 16/335,382

(22) PCT Filed: Aug. 3, 2017

(86) PCT No.: PCT/DE2017/100656
§ 371 (c)(1),
(2) Date: Mar. 21, 2019

(87) PCT Pub. No.: WO2018/054419
PCT Pub. Date: Mar. 29, 2018

(65) Prior Publication Data
US 2019/0217926 A1 Jul. 18, 2019

(30) Foreign Application Priority Data
Sep. 26, 2016 (DE) .................. 10 2016 118 079

(51) Int. Cl.
| | |
|---|---|
| *B63B 35/44* | (2006.01) |
| *B63B 22/02* | (2006.01) |
| *F03D 13/25* | (2016.01) |
| *B63B 21/50* | (2006.01) |

(52) U.S. Cl.
CPC .............. *B63B 22/02* (2013.01); *B63B 35/44* (2013.01); *F03D 13/25* (2016.05); *B63B 21/507* (2013.01); *B63B 21/508* (2013.01); *B63B 2035/446* (2013.01); *F05B 2230/6102* (2013.01); *F05B 2240/93* (2013.01); *Y02E 10/727* (2013.01); *Y02P 70/523* (2015.11)

(58) Field of Classification Search
CPC ....... E02B 2017/0091; B63B 2035/446; B63B 22/02; B63B 35/44; F03D 13/25
See application file for complete search history.

(56) References Cited

U.S. PATENT DOCUMENTS

| | | |
|---|---|---|
| 6,294,844 B1 | 9/2001 | Lagerwey |
| 8,657,534 B2 | 2/2014 | Jahnig |
| 10,308,328 B2 | 6/2019 | Siegfriedsen |
| | (Continued) | |

FOREIGN PATENT DOCUMENTS

| | | | |
|---|---|---|---|
| DE | 3224976 | 1/1984 | |
| DE | 102016118078 A1 * | 12/2017 | ............. F03D 13/25 |
| | (Continued) | | |

*Primary Examiner* — Frederick L Lagman
(74) *Attorney, Agent, or Firm* — Diederiks & Whitelaw, PLC.

(57) ABSTRACT

The invention relates to a unit, having a floating wind turbine, which has a floating foundation, and having a floating mooring buoy, which can be connected to the floating foundation of the floating wind turbine and which has at least one anchoring means for anchoring the mooring buoy to the bed of a body of water, characterized in that the floating foundation of the floating wind turbine has a hole for holding the mooring buoy.

19 Claims, 6 Drawing Sheets

(56) References Cited

U.S. PATENT DOCUMENTS

| | | | | |
|---|---|---|---|---|
| 2010/0143045 A1* | 6/2010 | Syvertsen | ........... | B63B 35/4413 405/207 |
| 2011/0037266 A1* | 2/2011 | Wille | ..................... | F03B 13/20 290/53 |
| 2011/0241347 A1* | 10/2011 | Boureau | ................. | F03D 13/40 290/53 |
| 2016/0075413 A1* | 3/2016 | Nebrera Garcia | ...... | E02D 27/42 114/122 |
| 2016/0185428 A1* | 6/2016 | Bauduin | ............... | B63B 21/508 441/5 |

FOREIGN PATENT DOCUMENTS

| | | | | |
|---|---|---|---|---|
| DE | 102017119635 B3 * | 12/2018 | ............... | F03D 7/02 |
| GB | 2542548 A * | 3/2017 | ............. | F03D 9/008 |
| WO | 02/073032 | 9/2002 | | |
| WO | WO-2006038091 A2 * | 4/2006 | ........... | B63B 21/502 |
| WO | 2011/014075 | 2/2011 | | |
| WO | WO-2016000681 A1 * | 1/2016 | ............. | B63B 21/50 |

* cited by examiner

MOORING BUOY FOR A FLOATING WIND TURBINE

CROSS-REFERENCE TO RELATED APPLICATIONS

This application represents the U.S. National Phase of International Application No. PCT/DE2017/100656 entitled "Mooring Buoy for a Floating Wind Turbine" filed 3 Aug. 2017, which claims priority from German Patent Application No. 10 2016 118 079.3 filed on 26 Sep. 2016. The entire contents of these applications are incorporated herein by reference.

BACKGROUND OF THE INVENTION

The invention relates to an anchoring buoy (mooring buoy) for a floating wind turbine, which, moved preinstalled to the future position of the wind turbine and is held at the desired position using a plurality of connecting elements, which are anchored to the ocean floor. This buoy is detachably connected to the floating wind turbine and also contains the energy delivery cable.

In addition to the established wind energy usage on land, offshore turbines are increasingly also being constructed. These turbines are subject to special demands with respect to low maintenance requirements, reliability, turbine size, and environmental influences. Presently, exclusively earth-bound offshore turbines are used, which are fixedly connected by steel pipes to the underlying surface.

Large transportation and construction ships, which are particularly costly to use, are required for the installation of these turbines. In addition, in the case of the earth-bound turbines, the water depth is limited and the ground has to have specific properties.

For some time, however, floating offshore wind turbines have also been increasingly considered, which are connected more or less rigidly to the ocean floor.

These floating turbines, which are connected via chain systems to the ground, do not have the above-mentioned disadvantages and can also be used at greater water depths. The field of use of wind turbines can thus be substantially expanded.

The present, slightly floating wind turbines are usually connected fixed in place to the ocean floor by means of chains. These chains are regularly positioned by means of anchors on the ground. For the installation of the wind turbine at the location, it is moved using tugboats and the chains are then directly fastened to the respective floats.

This is usually performed very swiftly and therefore requires a variety of large ships which have to be coordinated on location. This is not only expensive, but rather also time consuming.

Furthermore, the weather window for such an action is very small, since large wave heights can only be managed with difficulty.

However, a floating body anchored on the ocean floor by means of chains is known from WO 2016/000681 A1, which enables a mechanical fixation of a floating wind turbine with simultaneous electrical coupling to an undersea cable.

However, the problem exists in this case that the wind turbine floating on the water surface has to be connected to the floating body floating on the water surface, wherein this publication leaves it open as to how this connection is to be performed.

The object of the invention is therefore to provide an anchoring for a floating wind turbine which is to be executed safely, rapidly, and easily.

SUMMARY OF THE INVENTION

A buoy having preferably conical outer surface is thus used, wherein the small diameter of the cone points upward. The buoy preferably has a ring-shaped water tank which can be flooded and emptied. The interior of the ring-shaped buoy is open. A rotational connection, which is connected watertight on the outer ring to the buoy, is arranged in the middle region. The inner ring of the bearing is connected to a cover plate or is itself produced as such. This cover plate is thus rotatable in relation to the buoy.

The rotational connection, advantageously a three-row roller rotational connection, is sealed via special seals against the penetration of seawater.

The base plate has a central hole, through which the power cable is guided and which is sealed in relation to the seawater. Holes for the anchoring elements, preferably wire cables, are provided in the outer region of the base plate. The number is determined from the requirement of the permit and the wind park geometry. At least 5 anchoring elements are typically used, but 3, 4, and 6 anchoring elements would also not be unusual. For reasons of redundancy, a multiple of this number can also be used. The anchoring elements are also permanently fixed in the base plate in the desired position.

The ground fastening elements are introduced at suitable spacing into the floor of the body of water around the desired location of the wind turbine and the connecting elements, usually a chain on the anchor and the part to the buoy as a cable element, are laid to the center, the later location of the wind turbine. The buoy is moved to this position and connected to the connecting elements. In addition, a flexible high-voltage summary cable is connected to the buoy. The buoy floats on the water during this work.

When the wind turbine is finished, it is towed by means of tugboats to the location of the buoy. In this case, the floating wind turbine is surfaced out of the water in the towed position. The wind turbine has a conical opening on the front side of the floating foundation at the lower side of the float element. The opening is adapted in the geometry to the outer contour of the buoy.

The slip ring body for later connection to the power cable is located centrally above this conical opening. It is located in the water-free space above the water line in the transportation state.

For the connection of the buoy to the floating wind turbine, upon reaching the position, the buoy is flooded with seawater by opening a (base) valve by means of a remote control of the water tank and sunk to this predetermined depth and the wind turbine is towed using a positioning system having its base opening precisely above the submerged buoy. Corresponding sensors are provided. The ballast water is then expelled by compressed air stored in a compressed air tank, for example, and the buoy is moved again for the slow rise and inserted into the preferably conical opening on the foundation of the wind turbine. A fixed connection is then produced between the buoy and the wind turbine by screws, inter alia.

For protection from damage, the buoy can be covered with cushioning surfaces such as rubber mats or the like. After the connection of buoy and turbine, the space between the two is freed of entrained water and drained. The connection has a seal to keep water permanently out of this intermediate space. The power cable is then connected to the slip ring body located above it and the coupling to the network is established. The turbine is then lowered to operating depth and put into operation.

The procedure is reversed for the return of the turbine to the harbor for repair purposes and can be provided as needed. In the case of large repairs, cumbersome, hazardous, and costly offshore operations thus do not have to be carried out, but rather the turbine can be brought to the harbor using two small cost-effective tugboats and simultaneously a new or repaired turbine can be connected to the available buoy for power generation. This is not provided in the systems presently provided of floating offshore turbines.

A unit comprising a floating wind turbine having a floating foundation and a floating mooring buoy connectable to the floating foundation of the floating wind turbine having at least one anchoring means for anchoring the mooring buoy on the floor of the body of water is thus provided according to the invention, wherein the floating foundation of the floating wind turbine has a recess for accommodating the mooring buoy, wherein the recess of the mooring buoy is accessible from the lower side of the foundation and is formed at least partially complementary to the outer contour of the mooring buoy.

Exact positioning and a form fit, which is advantageous in principle for the force transmission, between wind turbine and mooring buoy is achieved in particular if the mooring buoy is formed conical (and the recess complementary thereto).

The mooring buoy itself is preferably formed from a conically tapering wall, which forms a hollow cylinder, and a base plate closing the hollow cylinder on one side, wherein the wall of the mooring buoy is mounted so it is rotatable in relation to the base plate.

In particular a first feedthrough arranged essentially in the base plate for feeding through an undersea cable is provided in particular in the base plate, wherein especially at least one further second feedthrough arranged in the base plate is advantageous for feeding through the anchoring means.

To be able to effectuate submersion and surfacing of the buoy, a ballast water tank is provided in the mooring buoy, preferably in its wall, which can be filled with water from the surroundings and can be blown out with the aid of compressed air. Corresponding aids in the form of pumps and valves are to be provided for this purpose. These aids are preferably operable by means of a radio remote control from the tugboat or from the wind turbine.

It is furthermore preferably provided that the recess of the floating foundation and the mooring buoy inserted into the recess form a closed space. The advantage of this design is that a dry space, which is also accessible for maintenance work, is provided, in which the electrical components of the wind turbine are protected from moisture.

Means are also to be provided in particular for tensioning the anchoring means and/or the undersea cable.

Finally, the mooring buoy can have shock-absorbing elements arranged on its outer circumference, which help to avoid damage to the mooring buoy or the wind turbine during the connection to the wind turbine.

The following steps are provided for the installation of a unit embodied having a ballast water tank:
- anchoring a mooring buoy (using connecting elements) at the predetermined location for the installation of the floating wind turbine,
- fastening an undersea cable to the mooring buoy,
- sinking the mooring buoy by flooding the ballast water tank,
- positioning the recess of the floating foundation of the floating wind turbine above the mooring buoy,
- inserting the mooring buoy into the recess of the floating foundation by causing the mooring buoy to surface by means of emptying of the ballast water tank, and
- connecting the undersea cable to the floating wind turbine by means of a slip ring.

The sinking of the wind turbine is preferably performed thereon jointly with the mooring buoy by means of flooding of ballast water tanks provided in the foundation of the wind turbine.

BRIEF DESCRIPTION OF THE DRAWINGS

The invention will be explained in greater detail on the basis of an exemplary embodiment designed in a particularly preferred manner, which is illustrated in the appended drawings. In the figures.

DETAILED DESCRIPTION OF THE PREFERRED EMBODIMENTS

Figure 1:
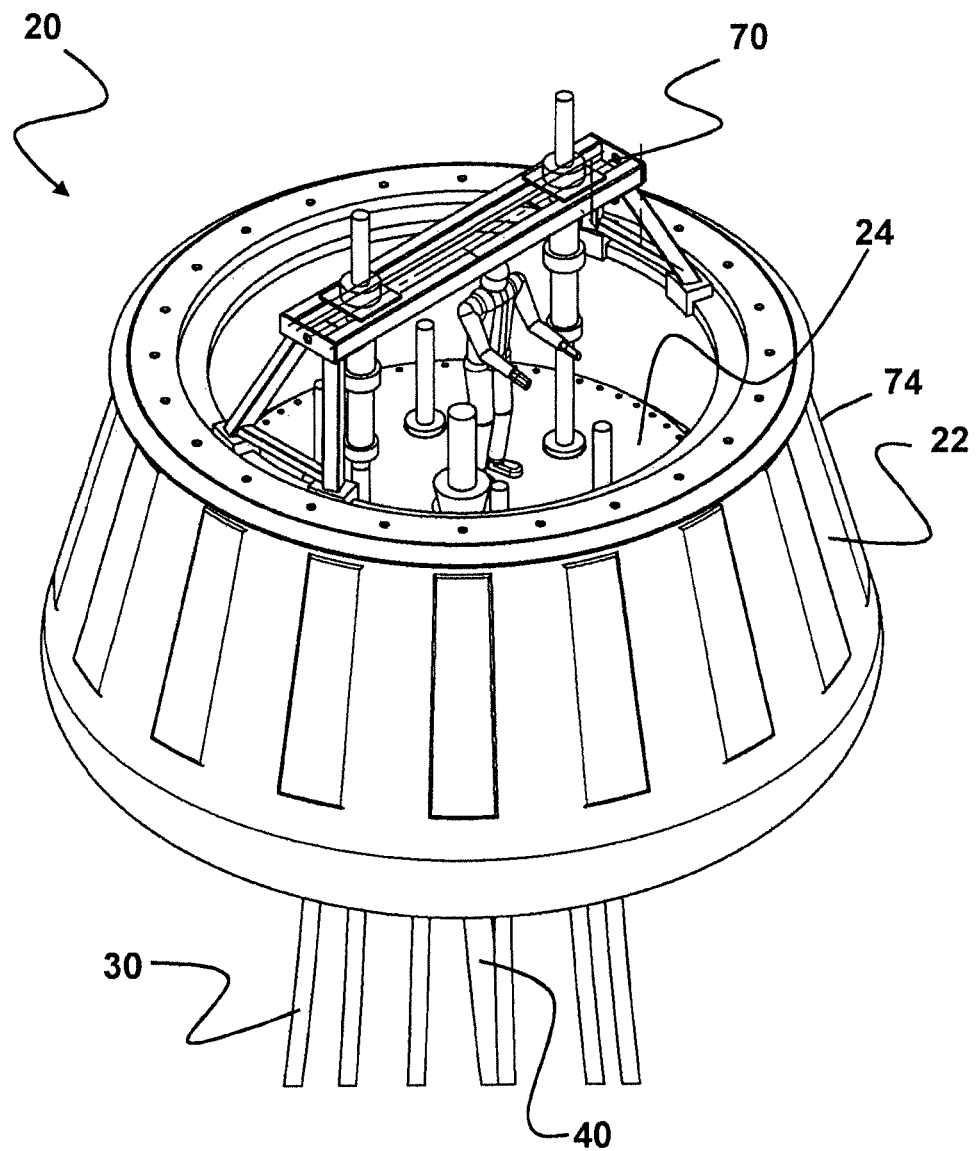
FIG. 1 shows a perspective view of a mooring buoy designed in a particularly preferred manner according to the invention.

FIG. 1 shows a perspective view of a mooring buoy designed in a particularly preferred manner according to the invention.

The mooring buoy 20 has a conical outer contour, which is formed by the wall 22 and tapers upward. The base of the cone is formed by a base plate 24, wherein the mooring buoy 20 is connected by means of anchoring means 30 to the floor of the body of water. In addition, the mooring buoy 20 is connected to an undersea cable 40, so that the mooring buoy 20 is provided as the sole anchor point for a floating wind turbine.

A means 70 supported on the upper edge of the wall 22 for tensioning the anchoring means 30 and/or the undersea cable 40 is also shown, so that the buoy 20 can be anchored precisely in location during its installation.

Figure 2:
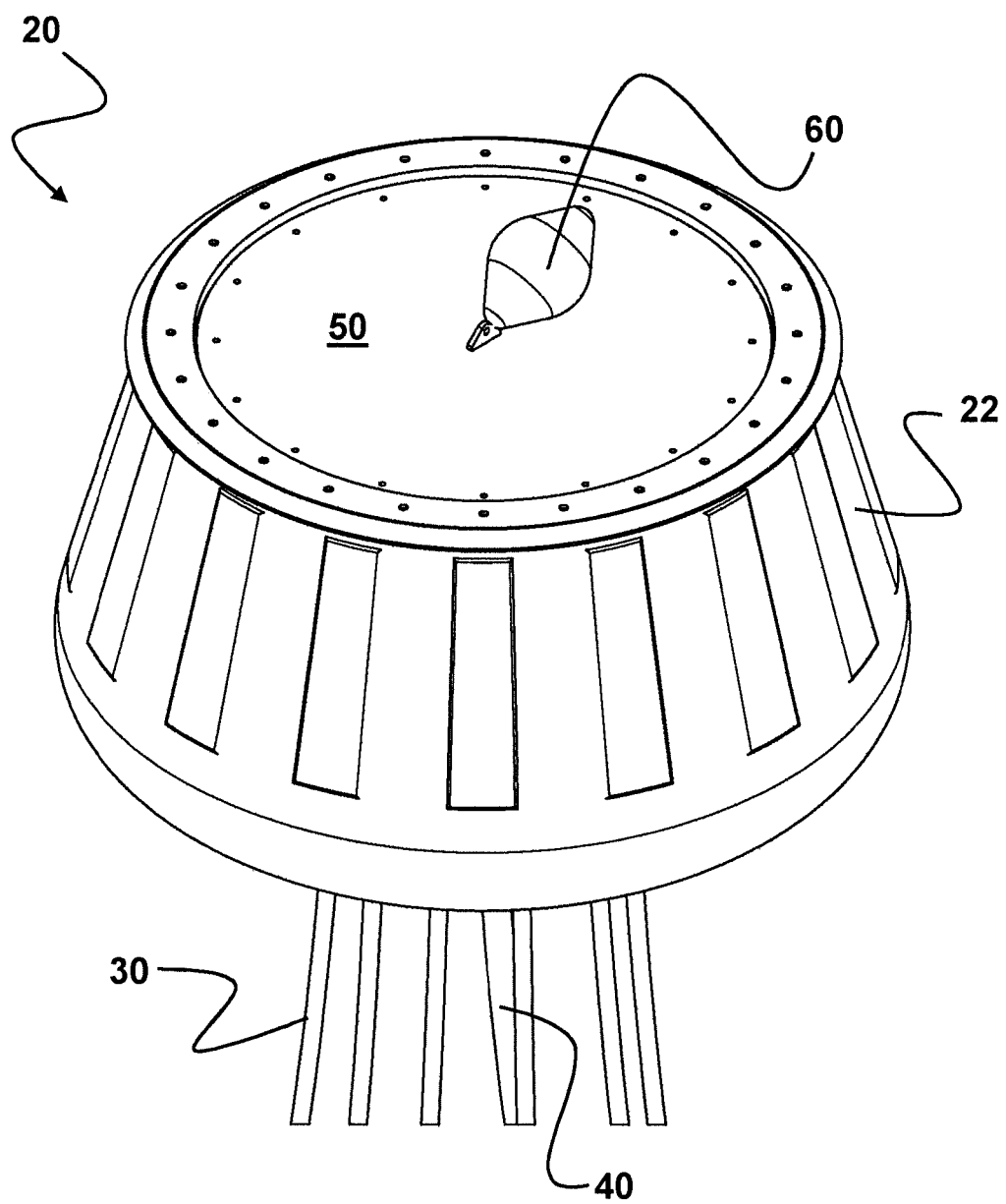
FIG. 2 shows a perspective view of the mooring buoy having a particularly preferred design according to the invention having a cover terminating the buoy space.

FIG. 2 shows a perspective view of the mooring buoy 20 designed in a particularly preferred manner according to the invention having a cover 50 terminating a space formed by the wall 22 and the base plate 24.

Figure 6:
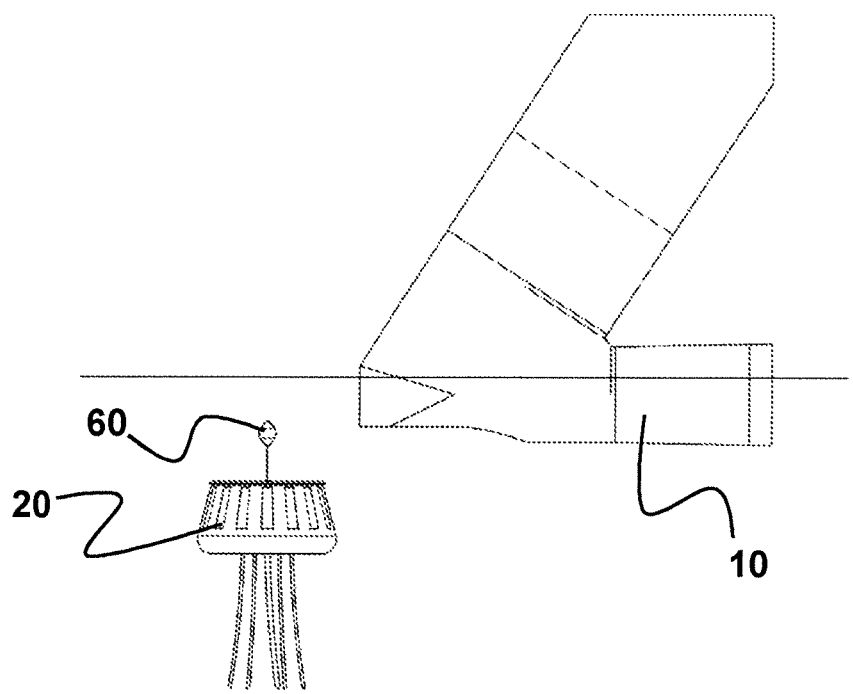
FIG. 6 shows a detailed side view of the sunken mooring buoy in the region of the recess of the foundation of the floating wind turbine.

A float 60, which—as shown in FIG. 6—can be used as a guide during the insertion of the buoy 20 into the foundation of the wind turbine, is fastened on the cover 50.

The cover 50 ensures that water cannot penetrate into the space reserved in the buoy 20. This is important in particular if the recess in the foundation of the wind turbine is accessible from below the foundation and the buoy 20 has to be sunk. The cover 50 is provided with respect to its geometry so that it can be removed after the insertion of the buoy 20 into the foundation of the wind turbine.

The cover 50 thus closes the buoy 20 after its anchoring until the connection to the wind turbine. The free end of the preinstalled undersea cable 40 is therefore protected from corrosion during this time span.

Finally, the mooring buoy can have shock-absorbing elements 74 arranged on its outer circumference, which help to avoid damage to the mooring buoy or the wind turbine during the connection to the wind turbine.

Figure 3:
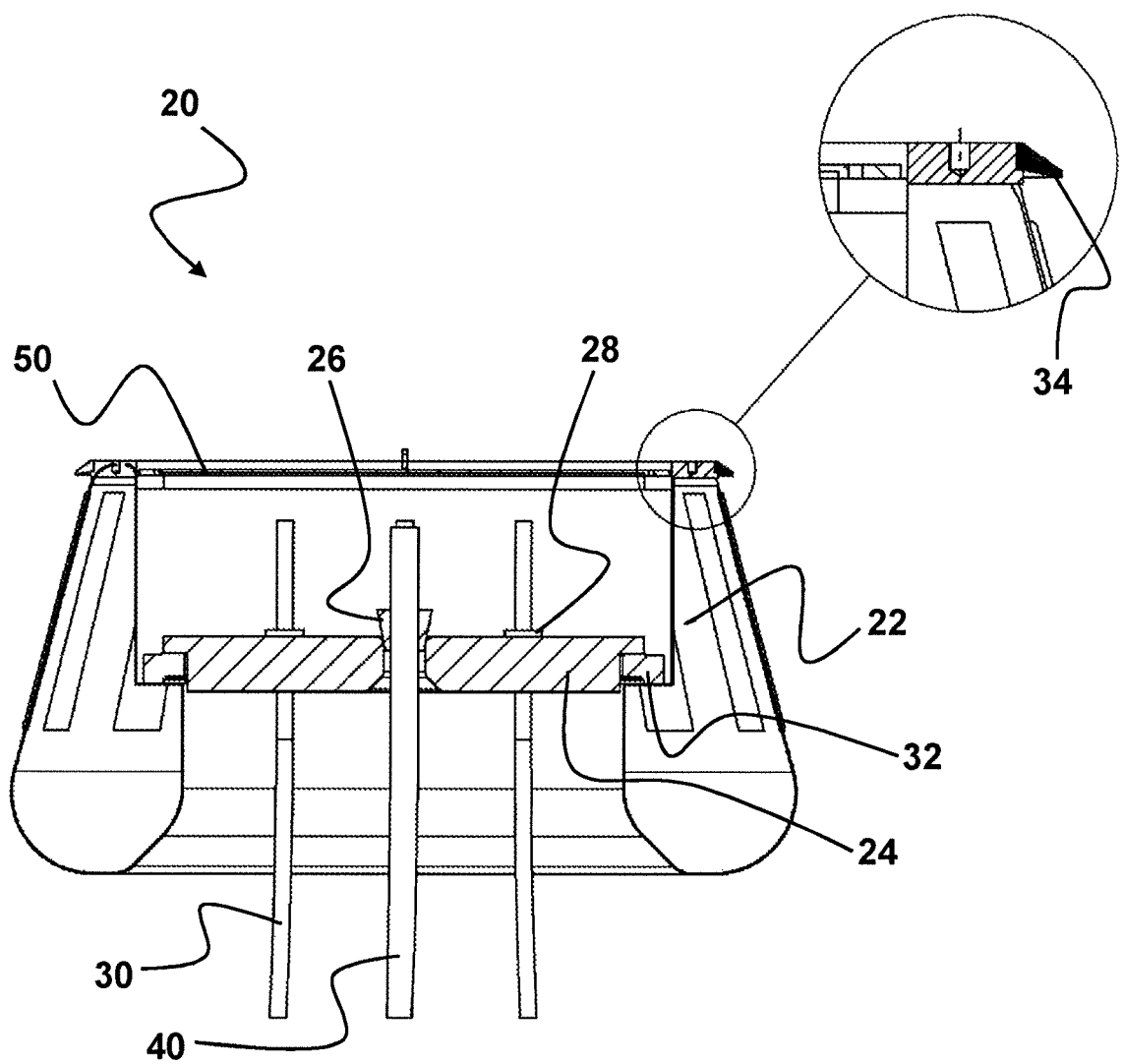
FIG. 3 shows a sectional view through the mooring buoy.

It can be seen in the sectional view illustrated in FIG. 3 that the wall 22 of the mooring buoy 20 is mounted so it is rotatable about its base plate 24. The anchoring means 30 and the undersea cable 40, in contrast, are connected in a rotationally-fixed manner to the base plate 24 through feedthroughs 26, 28 provided in the base plate 24. In this case, the undersea cable 40 is guided centrally through the base plate 24, in order to keep any strain acting on the undersea cable 40 and occurring due to the rotational movement of the buoy 20 small. A seal 34 provided on the upper fastening flange of the buoy 20 seals the recess 12 of the foundation in relation to the seawater after the connection of the buoy 20 to the wind turbine 100 (see also FIG. 8).

Due to the ability of the wall 22 to rotate in relation to the base plate 24, the wind turbine can rotate around the base plate 24 fixed by means of the anchoring element 30 via the rotational connection 32 upon a fixation of wall 22 and foundation of the wind turbine.

Figure 4:
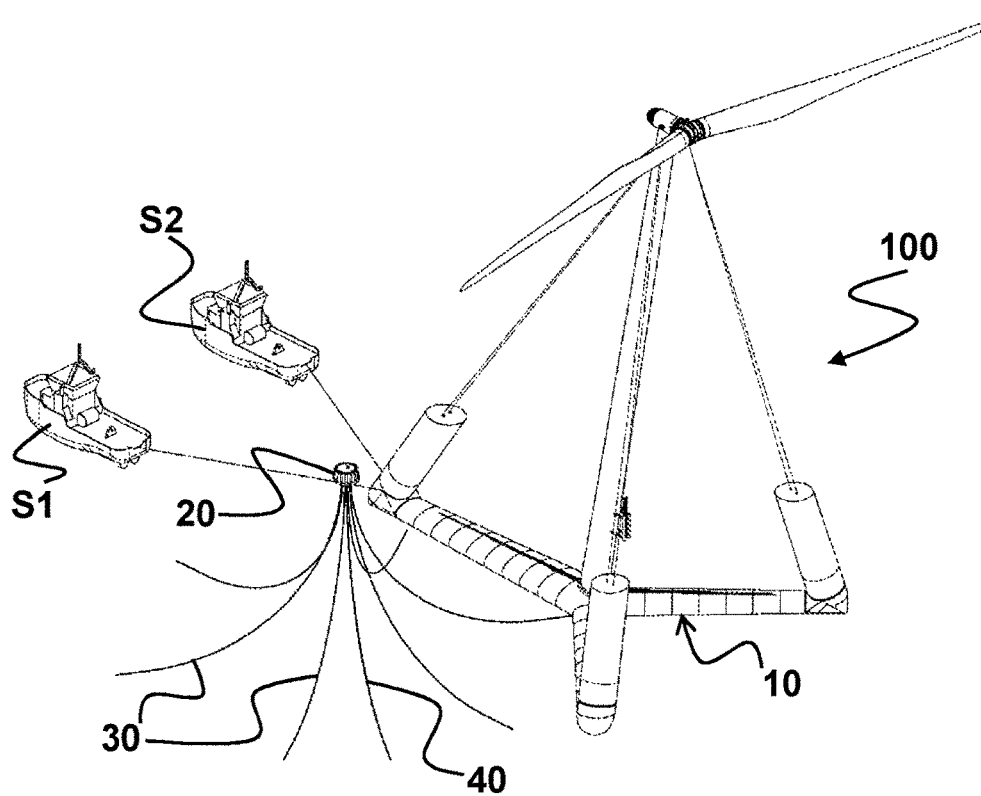
FIG. 4 shows a perspective view of a unit having a particularly preferred design according to the invention during the installation at an offshore location.

For the installation of a unit formed in this manner—as shown in FIG. 4—a floating wind turbine 100 on its foundation 10 is towed by two tugboats S1, S2 to the installation location in such a way that the tugboats S1, S2 take the mooring buoy 20 between them and mooring buoy 20 and foundation 10 of the floating wind turbine 100 approach one another.

Figure 5:
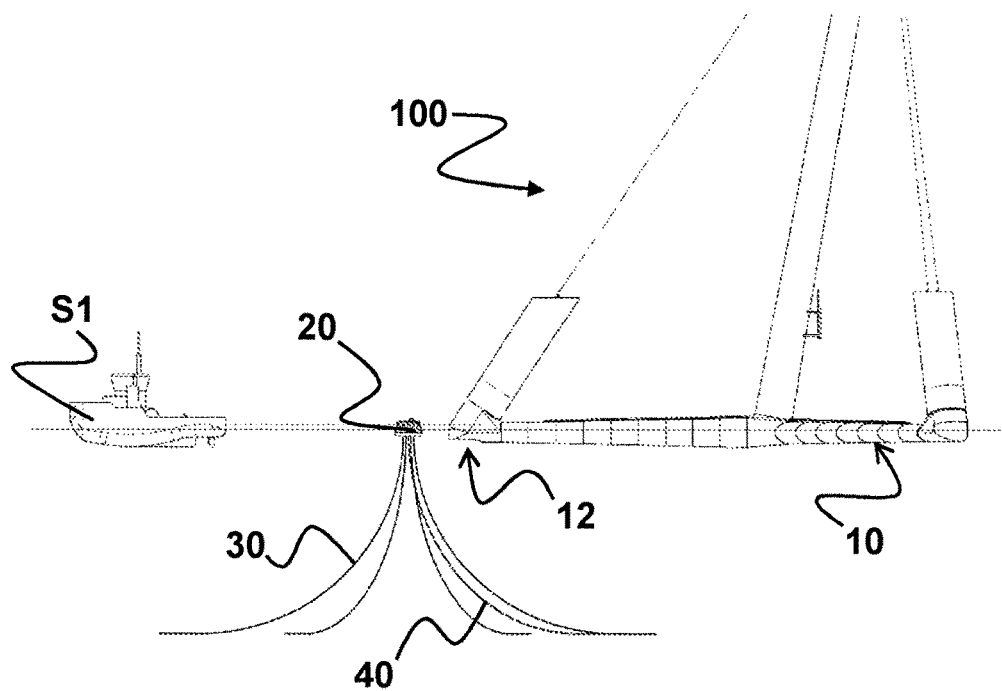
FIG. 5 shows a side view of the unit illustrated in FIG. 4.

It can be seen in FIG. 5 both the mooring buoy 20 and also the floating foundation 10 of the wind turbine 100 float on the surface of the body of water in this method step.

In order that the mooring buoy 20 can now be inserted into the recess 12 of the foundation 10 accessible from below the waterline, it is necessary for the buoy 20 to be sunk. This is performed in particular by taking on ballast water, wherein the buoy 20 preferably has a ballast water tank, which is arranged in the wall 22 and in particular is ring-shaped. This tank can be flooded with seawater by the remote control of an undersea valve.

FIG. 6 shows a side view of the sunken mooring buoy 20 in the region of the foundation 10 of the floating wind turbine 100, wherein the float 60 also arranged on the buoy 20 is recognizable.

The float 60 can be used as a guide structure for the insertion of the buoy 20 into the recess 12, for example, it can be grasped and guided. Alternatively or additionally, the float 60 can also be designed in such a way that it can be actively or passively located to facilitate the positioning of the wind turbine 100 in relation to the buoy 20.

Figure 7:
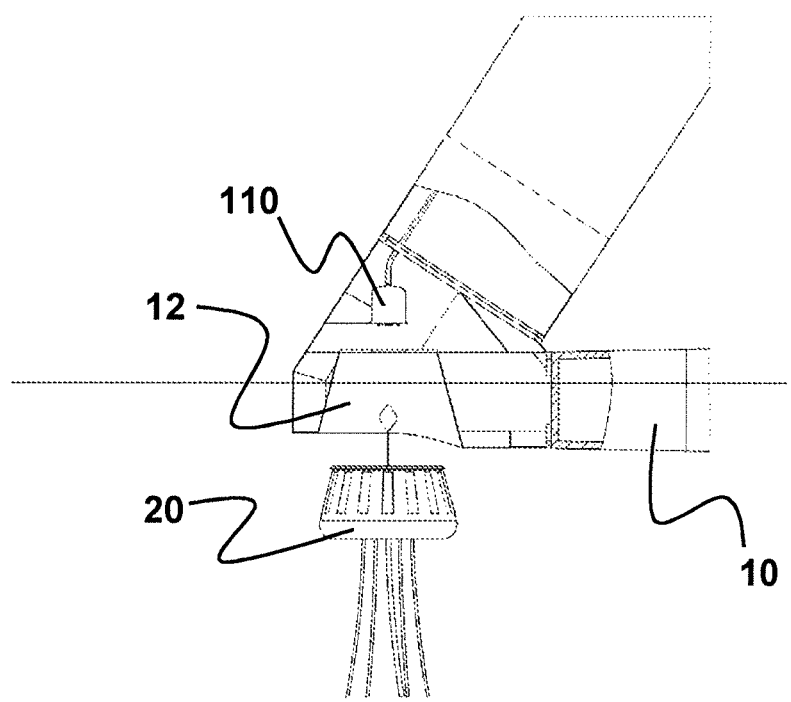
FIG. 7 shows a side view of the wind turbine positioned above the mooring buoy.
Figure 8:
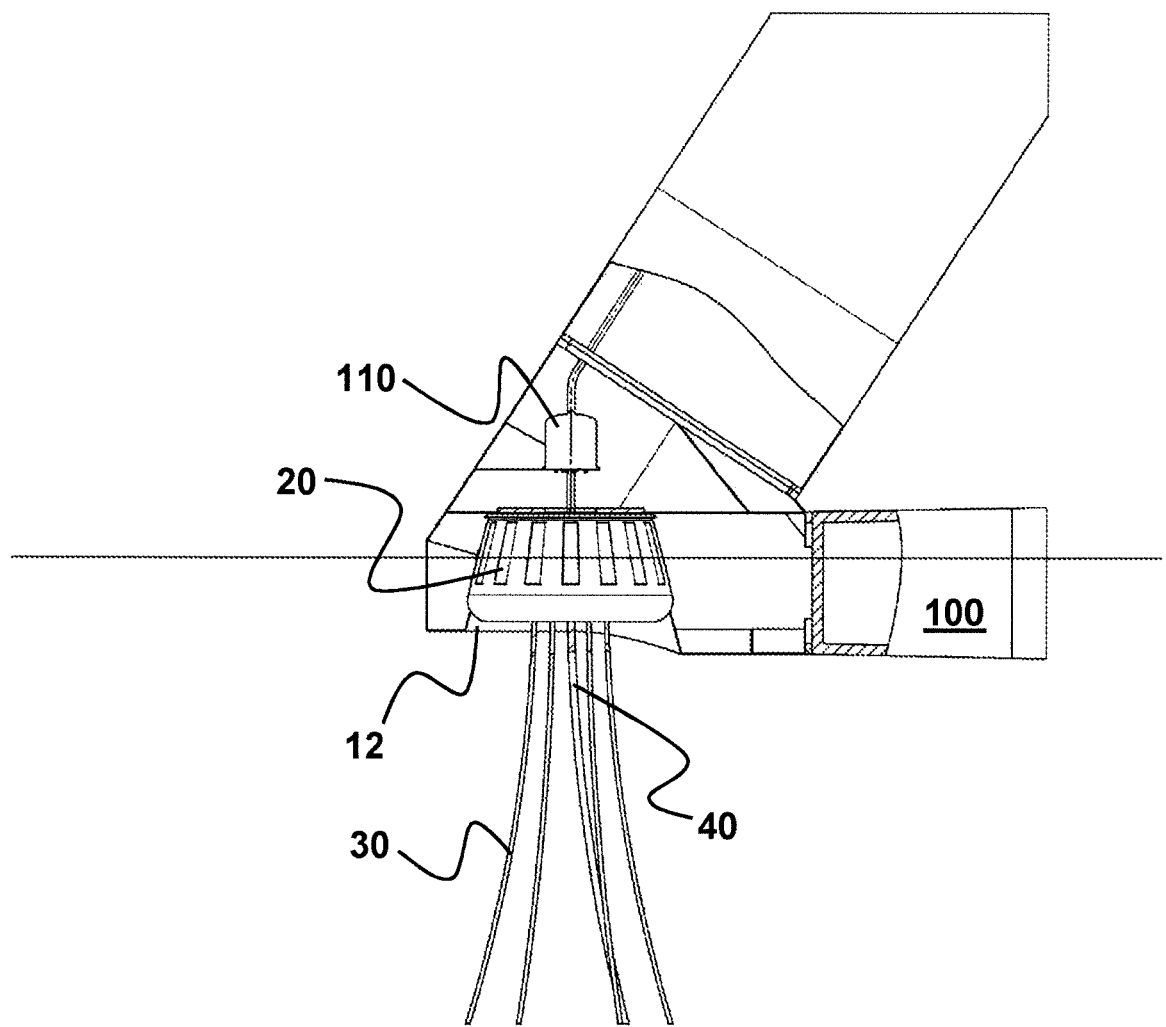
FIG. 8 shows the wind turbine connected to the mooring buoy.

Via the position shown in a side view in FIG. 7, the mooring buoy 20 is finally transferred into the position shown in FIG. 8 in which the mooring buoy 20 is connected to the wind turbine 100 after the insertion into the recess 12 of the foundation 10.

It can also be seen that the undersea cable 40 is connected to the slip ring body 110, which is arranged above the feedthrough 26 arranged centrally in the base 24 of the buoy 20.

The wind turbine 100 is thus fundamentally ready for use.

For reasons of stability, the foundation 10 is sunk by flooding ballast water tanks provided in the foundation 10, so that the influence of waves has a smaller effect than in the case of a wind turbine 100 floating on the water surface.

The invention claimed is:

1. A unit comprising
a floating wind turbine having a floating foundation and
a floating mooring buoy connectable to the floating foundation of the floating wind turbine, having at least one anchor for anchoring the mooring buoy on the floor of the body of water, wherein the floating foundation of the floating wind turbine has a recess for accommodating the mooring buoy, wherein the recess of the floating foundation is accessible from the lower side of the foundation and is formed at least partially complementary to the outer contour of the mooring buoy, wherein the mooring buoy is formed from a base plate and a wall that is mounted to be rotatable in relation to the base plate.

2. The unit as claimed in claim 1, wherein the mooring buoy is formed conical.

3. The unit as claimed in claim 1, wherein the mooring buoy is formed from a conically tapering wall, which forms a hollow cylinder, and a base plate closing the hollow cylinder on one side.

4. The unit as claimed in claim 3, further comprising a first feedthrough, arranged centrally in the base plate, for feeding through an undersea cable.

5. The unit as claimed in claim 4 further comprising at least one second feedthrough, arranged in the base plate, for feeding through the anchor.

6. The unit as claimed in claim 4, wherein the mooring buoy has at least one ballast water tank.

7. The unit as claimed in claim 4, wherein the recess of the floating foundation and the mooring buoy inserted into the recess form a closed space.

8. The unit as claimed in claim 3 further comprising at least one second feedthrough, arranged in the base plate, for feeding through the anchor.

9. The unit as claimed in claim 3, wherein the mooring buoy has at least one ballast water tank.

10. The unit as claimed in claim 9, wherein the recess of the floating foundation and the mooring buoy inserted into the recess form a closed space.

11. The unit as claimed in claim 3, wherein the recess of the floating foundation and the mooring buoy inserted into the recess form a closed space.

12. The unit as claimed in claim 3, further comprising a first feedthrough, arranged centrally in the base plate, for feeding through an undersea cable.

13. The unit as claimed in claim 3, further comprising at least one second feedthrough, arranged in the base plate, for feeding through the anchor.

14. The unit as claimed in claim 3, wherein the mooring buoy has at least one ballast water tank.

15. The unit as claimed in claim 3, wherein the recess of the floating foundation and the mooring buoy inserted into the recess form a closed space.

16. The unit as claimed in claim 1, further comprising means for tensioning the anchoring means and/or undersea cable provided in the mooring buoy.

17. The unit as claimed in claim 1, further comprising shock absorbing elements arranged on the outer circumference of the mooring buoy.

18. A method for installing a unit including
a floating wind turbine having a floating foundation and a floating mooring buoy connectable to the floating foundation of the floating wind turbine, having a ballast water tank and at least one anchor for anchoring the mooring buoy on the floor of the body of water, wherein the floating foundation of the floating wind turbine has a recess for accommodating the mooring buoy, wherein the recess of the floating foundation is accessible from the lower side of the foundation and is formed at least partially complementary to the outer contour of the mooring buoy, the method, comprising the following steps:

anchoring the mooring buoy at a predetermined location for the installation of the floating wind turbine, fastening an undersea cable to the mooring buoy, sinking the mooring buoy by flooding the ballast water tank, positioning the recess of the floating foundation of the floating wind turbine above the mooring buoy, inserting the mooring buoy into the recess of the floating foundation by causing the mooring buoy to surface by emptying of the ballast water tank, fastening the mooring buoy on the wind turbine, and connecting the undersea cable to the floating wind turbine by means of a slip ring.

19. The method as claimed in claim 18, further comprising sinking of the wind turbine jointly with the mooring buoy by flooding of ballast water tanks provided in the foundation of the wind turbine.

* * * * *